US008157632B2

(12) United States Patent
Hall

(10) Patent No.: US 8,157,632 B2
(45) Date of Patent: *Apr. 17, 2012

(54) CASINO WAGERING GAME WITH MULTIPLE PAYOUT LEVELS

(76) Inventor: Geoff Hall, Shirley (GB)

( * ) Notice: Subject to any disclaimer, the term of this patent is extended or adjusted under 35 U.S.C. 154(b) by 995 days.

This patent is subject to a terminal disclaimer.

(21) Appl. No.: 12/127,785

(22) Filed: May 27, 2008

(65) Prior Publication Data

US 2008/0227537 A1 Sep. 18, 2008

Related U.S. Application Data

(63) Continuation-in-part of application No. 10/963,899, filed on Oct. 13, 2004, now Pat. No. 7,435,172, which is a continuation-in-part of application No. 10/654,876, filed on Sep. 4, 2003, now abandoned, application No. 12/127,785, which is a continuation-in-part of application No. 11/611,842, filed on Dec. 15, 2006, now abandoned.

(30) Foreign Application Priority Data

Sep. 4, 2002 (GB) .................................. 0220501.1

(51) Int. Cl.
*A63F 13/00* (2006.01)
*A63F 1/00* (2006.01)

(52) U.S. Cl. ......................................... 463/13; 273/292

(58) Field of Classification Search .................... 463/13; 273/292

See application file for complete search history.

*Primary Examiner* — Peter DungBa Vo
*Assistant Examiner* — Jeffrey Wong
(74) *Attorney, Agent, or Firm* — Muskin & Cusick LLC

(57) ABSTRACT

A method, system, and computer readable storage medium to provide a wagering game with multiple levels. A player can place an initial wager on a first wagering game which uses a first paytable. If the player wins the first game, then the initial wager is paid using the first paytable. The initial wager stays alive and is the initial wager is then bet on a second wagering game which pays a player win on the initial wager using a second paytable. The second paytable is typically more player favorable than the first paytable. Before the second wagering game, a second wager can be placed on the second wagering game which would pay using the first paytable. Thus, multiple wagers can be placed simultaneously which each use different paytables.

19 Claims, 3 Drawing Sheets

CASINO WAGERING GAME WITH MULTIPLE PAYOUT LEVELS

CROSS REFERENCE TO RELATED APPLICATIONS

This application claims benefit of priority under 35 U.S.C. section 119 to commonly owned Great Britain Application No. GB0710123.1, filed in the Great Britain Patent Office by inventor Geoff Hall, the foreign application of which is incorporated by reference herein in its entirety for all purposes. This application is also a continuation in part of application Ser. No. 10/963,899 filed on Oct. 13, 2004, now U.S. Pat No. 7,435,172 which is a continuation in part application of application Ser. No. 10/654,876 filed on Sep. 4, 2003, now abandoned which claims priority under 35 U.S.C. section 119 to Great Britain application No. 00220501.1, filed in the Great Britain Patent Office in Sep. 4, 2002, all three of these application Ser. Nos. (10/963,899; 10/654,876; 00220501.1) are incorporated by reference herein in their entireties for all purposes. This application is also a continuation in part of application Ser. No. 11/611,842, filed on Dec. 15, 2006, now abandoned which is incorporated by reference herein in its entirety for all purposes.

BACKGROUND OF THE INVENTION

1. Field of the Invention

The present inventive concept relates to a system, method, and computer readable storage, for playing a variation of a casino wagering game.

2. Description of the Related Art

Casino wagering games have been developed which provide greater pay schedules based on successful prior play. For example, U.S. Pat. No. 6,612,927, entitled, “Multi-stage multi-bet game, gaming device and method” allows a player, upon winning successive hands, to be rewarded with more favorable payout schedule.

One disadvantage to the system in the U.S. Pat. No. 6,612,927 is that the player must place multiple initial bets, of which the player can all lose if the player loses an initial game.

Therefore, what is needed is a system which can offer favorable payouts without exposing the player to a large initial loss.

SUMMARY OF THE INVENTION

It is an aspect of the present general inventive concept to provide an exciting multi level wagering game.

The above aspects can also be obtained by a method that includes (a) receiving a first wager from a player; (b) dealing and completing a first game; (c) determining whether the player wins or loses the first game, if the player loses the first game then taking the first wager from the player and ending the method, if the player wins the first game then continuing the method; (d) paying the first wager using a first paytable; (e) dealing and completing a second game; and (f) determining whether the player wins or loses the second game, if the player loses the second game then taking the first wager from the player, if the player wins the second game then paying the first wager using a second paytable.

The above aspects can also be obtained by an apparatus that includes (a) a processing unit, performing: (b) receiving a first wager from a player; (c) dealing and completing a first game; (d) determining whether the player wins or loses the first game, if the player loses the first game then taking the first wager from the player and ending the method, if the player wins the first game then continuing the method; (e) paying the first wager using a first paytable; (f) dealing and completing a second game; (g) determining whether the player wins or loses the second game, if the player loses the second game then taking the first wager from the player, if the player wins the second game then paying the first wager using a second paytable, the second paytable being different from the first paytable; and (h) an output device to display results of the processing unit.

These together with other aspects and advantages which will be subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

Further features and advantages of the present invention, as well as the structure and operation of various embodiments of the present invention, will become apparent and more readily appreciated from the following description of the preferred embodiments, taken in conjunction with the accompanying drawings of which.

DESCRIPTION OF THE PREFERRED EMBODIMENTS

Figure 1:
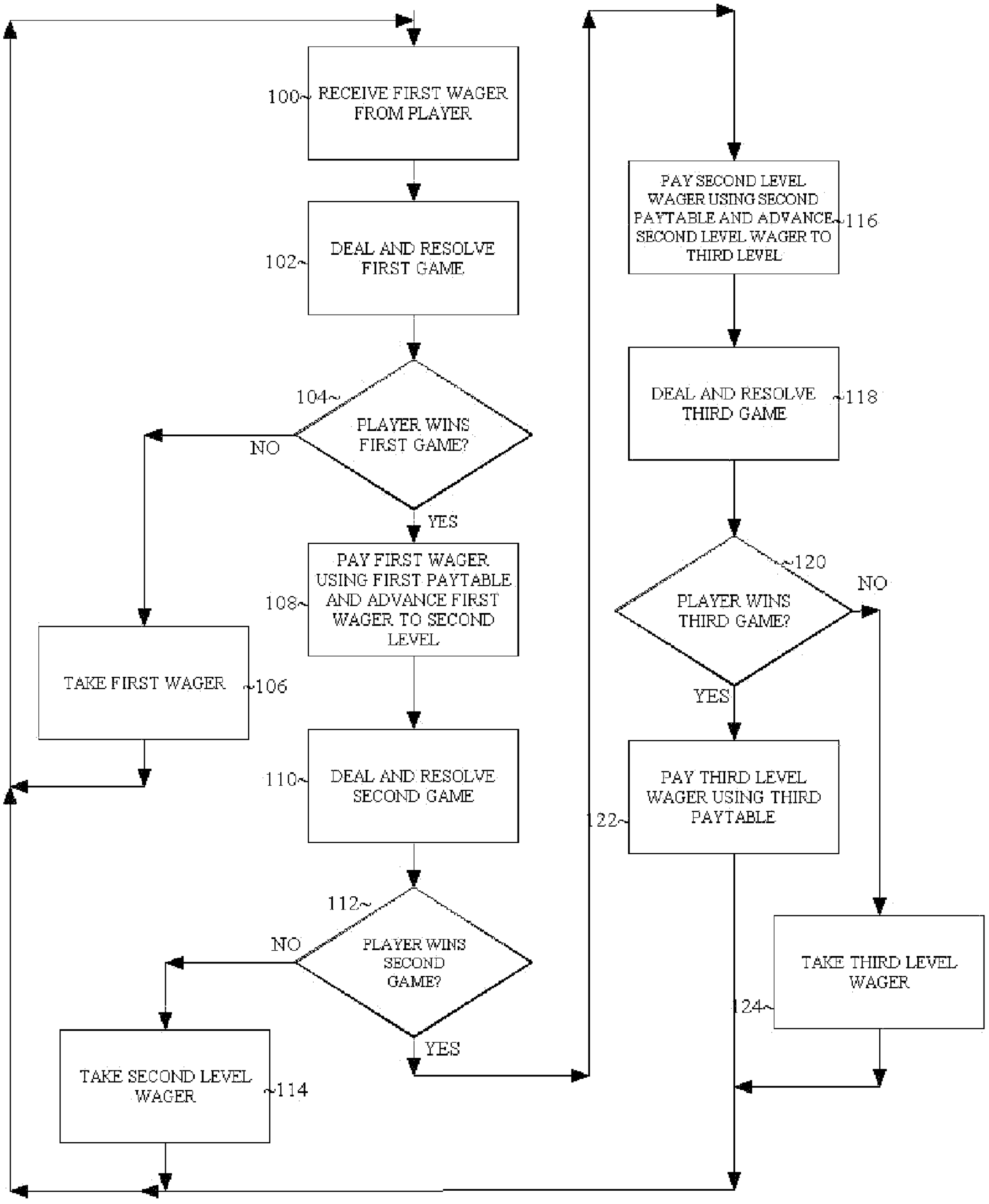
FIG. 1 is a flowchart illustrating an exemplary method of implementing a wagering game, according to an embodiment.

Reference will now be made in detail to the presently preferred embodiments of the invention, examples of which are illustrated in the accompanying drawings, wherein like reference numerals refer to like elements throughout.

The general inventive concept relates to a wagering methodology which can be applied to numerous different wagering games. The method allows a player to place an initial wager for a first predetermined paytable. A game is conducted, and if the player loses the game (and the initial wager), then the player can begin the method all over again. If the player wins the game, then the player is paid using a first predetermined paytable and then the initial wager the player placed can become a second level wager. A second game is conducted, and if the player loses the second game, then the player loses the second level wager (although the player has already been paid previously on the first wager) and the method ends. If the player wins the second game, then the second level wager is paid using a second predetermined paytable (the second predetermined paytable typically being different and more favorable to the player than the first paytable) and the second level wager now becomes a third level wager. This method can continue as many times as the house rules of the game permits (e.g., from 2-10).

The game used for the method can be any wagering game where the player places a wager and then wins or loses the wager (ties can also be allowed). This may or may not involve a dealer’s hand. For example, a simple stud poker hand can be used for the game, wherein the player is dealt n cards (n can be anywhere from 1-10), and the player forms the best hand using dealt cards. If the hand is greater than a predetermined winning rank, then the player wins (and may get a bonus depending on the rank of the hand the player has made). If the hand is not greater than the predetermined rank, then the player loses. If the player achieves a particular hand, this can also be considered a win even though the player may not necessarily be paid a payout on the winning hand. Since the player gets to advance this can be considered a "win."

The method can also use a dealer vs. player poker game, wherein the player is dealt n cards (n can be anywhere from 1-10) and the player forms the best hand using dealt cards. The dealer is also dealt a hand, and the dealer forms a best hand using the dealer's cards. Community cards may or may not be used. If the player's hand is higher than the dealer's hand, then the player wins, otherwise the player loses. The player may be entitled to a bonus payout based on a rank of the player's hand. For examples of poker games that can be used as individual games for the methods described herein, see U.S. Pat. No. 6,698,759, which is incorporated by reference herein in its entirety.

Blackjack can also be used as the game for the method. The player can be dealt a blackjack hand and play against a dealer, as known in the art. The player will win his or her wager, or lose the wager, and the method can proceed accordingly. For a description of blackjack games that can be used as individual games for the methods described herein, see U.S. patent application Ser. No. 11/611,842, which is incorporated by reference herein in its entirety.

These are just examples of some games that can be used for the method. The methods described herein can be implemented using any known wagering game wherein the player places a wager and then wins or loses (such game is used in operations 102, 110, 118).

FIG. 1 is a flowchart illustrating an exemplary method of implementing a wagering game, according to an embodiment.

The method beings with operation 100, which receives a first wager from a player. This is done as known in the art, wherein the player places chips (which are directly redeemable for cash) in a first level betting circle on a gaming table. The first level betting circle indicates that its respective wager is a "first level wager" which uses a first predetermined paytable.

The method proceeds to operation 102, which deals and resolves the first game. As described herein, the first game can be any wagering game, such as poker, blackjack, etc.

From operation 102, the method can proceed to operation 1024, which determines whether the player won the game played in operation 102 (the first game).

If the determination in operation 104 determines that the player lost the first game, then the method proceeds to operation 106, wherein the first wager is taken (nothing is paid to the player). The round of the method can end here, and can begin again at operation 100.

If the determination in operation 104 determines that the player won the first game, then the method proceeds to operation 108, which pays the first wager using a first paytable and the first wager is advanced. The advancing can be performed by a physical moving of the first wager into a different location on the table to indicate that the wager is now at a second level. For example, if the player bet a $1 chip in operation 100, the $1 is placed in a first level betting circle, and in operation 108, the $1 chip can be moved from the first wager betting circle to a second level betting circle in order to indicate the $1 chip's status now as a second level wager which uses the second paytable. Alternatively, instead of physically moving the chip, a marker or lamer can be used to indicate the change in status. Alternatively, nothing needs to be used to indicate the bet's change in status.

At this point, the player can also optionally place a new wager in the first level betting circle which uses the first paytable for the second game.

From operation 108, the method proceeds to operation 110, which deals and resolves a second game. Typically, the second game would be the same as the first game in operation 102 (e.g., the same rules as to how to win or lose).

From operation 110, the method proceeds to operation 112, which determines whether the player wins the second game. This is done based on predetermined rules for the second game.

If the determination in operation 112 determines that the player loses the second game, then the method proceeds to operation 114, wherein the house takes the second level wager (which is the same wager as the initial wager placed in operation 100). The house would also take a live first level wager, if one was made in operation 108. The round is over and the method can begin anew at operation 100.

If the determination in operation 112 determines that the player wins the second game, then the method proceeds to operation 116, which pays the second level wager using the second paytable and advances the second level wager. The second paytable is different than the first paytable and would typically be more player favorable than the first paytable. The advancing can be performed by a physical moving of the second level wager (which used to be the first wager) into a different location on the table to indicate that the wager is now a third level wager. For example, if the player bet a $1 chip in operation 100, the $1 is placed in a first wager betting circle, and in operation 108, the $1 chip was moved from the first level betting circle to a second level betting circle in order to indicate the $1 chip's status as a second level wager. Now, the $1 chip is moved from the second level betting circle into a third level betting circle to indicate this wager's status as a third level wager which uses the third paytable. Alternatively, instead of physically moving the chip, a marker or lamer can be used to indicate the change in status. Alternatively, nothing needs to be used to indicate the bet's change in status.

If the player also placed an additional first level wager in operation 108, then this wager is also paid using the first paytable. This wager is now advanced from the first level betting circle to the second level betting circle, and this wager will now pay according to the second paytable for game three.

At this point, the player also has the option of placing another wager at the first level on the outcome of game three which uses the first paytable.

From operation 116, the method proceeds to operation 118, which deals and resolves a third game. Typically, the second game would be the same as the first game in operation 102 and the second game in operation 110 (e.g., the same rules as to how to win or lose).

From operation 118, the method proceeds to operation 120, which determines whether the player wins the third game. This is done based on predetermined rules for the third game.

If the determination in operation 120 determines that the player did not win the third game, then the method proceeds to operation 124, wherein the house takes the third level wager (and any second level wagers present and any first level wagers present). The round is now over, and a new round can begin by returning to operation 100.

If the determination in operation 120 determines that the player did win the third game, then the method proceeds to operation 122, which pays the third level wager using a third paytable. The third paytable is typically different than the first paytable and the second paytable, and is typically more player favorable than both the first paytable and the second paytable.

The third level wager is the same wager as the first wager placed in operation 100 which was then advanced to a second level wager in operation 108.

If there is a live second level wager (a wager placed at operation 108 which won), then the second level wager can be paid according to the second paytable. If there is a live first level wager (a wager placed at operation 116 which won), then the first level wager can be paid according to the first paytable.

The method can continue, with the third level wager being returned to the player, and any second level wager advancing to be a third level wager and any first level wager advancing to be a second level wager. A new game can then begin and the game can continue in this fashion indefinitely until the player loses, in which the player would lose all live bets.

Alternatively, the round can continue to a fourth game, by advancing the third level wager to become a fourth level wager (and advancing any other live wagers up a level as described herein) and dealing a fourth game wherein a winner on the fourth level wager is paid using a more favorable fourth paytable, and so on. There is no limit to the number of individual games the method can comprise.

A tie can be handled in numerous ways. In one embodiment, in event of a tie, all live bets push (don't get paid or taken) and none of the live bets advance. A new game is dealt as if the tied game never happened. For example, if in operation 102, a tie occurs, then a new game can be dealt before proceeding further in the method. If in operation 110 a tie occurs, then a new game can be dealt before proceeding further in the method. Alternatively, in event of a tie, bets can push but still be advanced to a next level.

Typically, in the method illustrated in FIG. 1, first level wagers, second level wagers, and third level wagers (and fourth level wagers, if the embodiment has four levels, etc.) would win and lose together. In other words, in this embodiment, it would not be possible for a first level wager to win while a second level wager to lose. In an alternate embodiment, it would be possible for different level wagers to not win or lose together because different paytables and/or rules could be used for each level wager. It may also be possible for one of the wagers (e.g., first level wager) to push (and advance) while other wagers (e.g., second level wagers) win.

It is recommended that each game (operations 102, 110, 118) be the same game (e.g., blackjack, stud poker). Further, if the same game is played for each game (operations 102, 110, 118) the same rules can be applied for each level or alternatively different rules can be applied for each game (operations 102, 110, 118). An example of different rules being applied is, if blackjack is being used, on one level (e.g., operation 102) the dealer can hit a soft 17 while on another level (e.g., operation 110) the dealer will stand on a soft 17.

Figure 2:
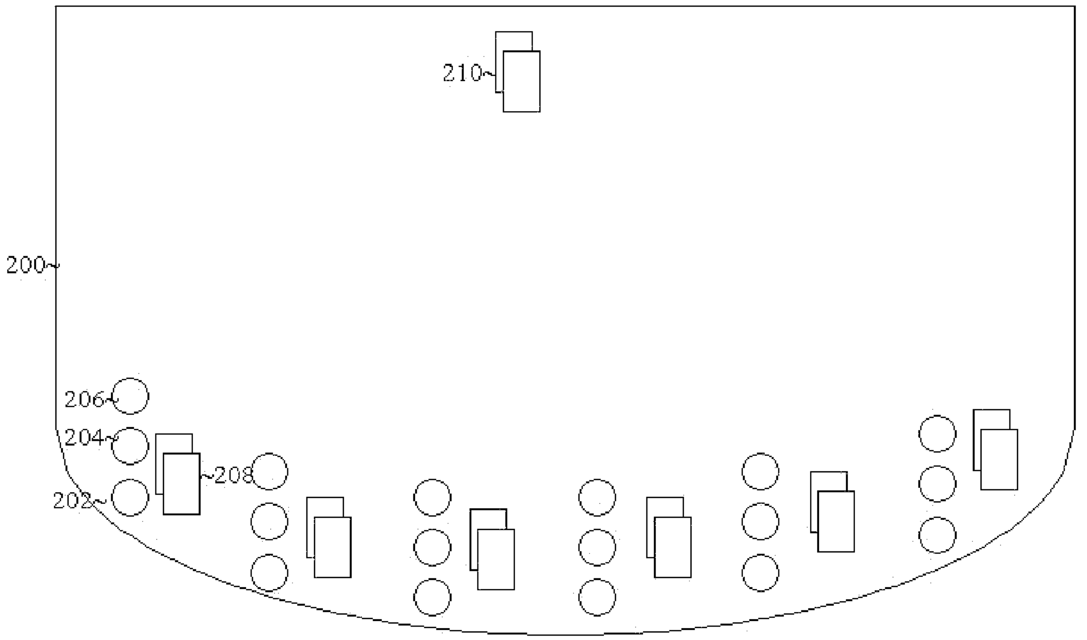
FIG. 2 is drawing illustrating an example of a gaming table, according to an embodiment.

FIG. 2 is drawing illustrating an example of a gaming table, according to an embodiment.

A gaming table 200 can be used to implement the methods described herein in a casino. Of course, this is just one example of a table layout, and it can be appreciated that numerous other configurations can be used as well.

A first level betting circle 202 is used by a first player to place the first (initial) wager (from operation 100). Any winning wager on the first level betting circle 202 would be paid according to a first paytable. A second level betting circle 204 is used when the first player wins the first game and the first wager is then advanced to the second level betting circle 204 (see operation 108). Any winning wager on the second level betting circle 204 would be paid according to a second paytable. A third level betting circle 206 is used when the first player wins the second game and the second level wager is then advanced to the third level betting circle 206 (see operation 116). A first player's hand 208 is used to determine the winner of a particular game (e.g., the first game, the second game, or the third game). A dealer's hand 210 is also used to determine the winner of the particular games (e.g., the first game, the second game, or the third game). In a further embodiment, the dealer's hand is not used, and whether each player wins or loses is determined based on only each players' respective hand.

Typically, the player will only place a wager in the first level betting circle 202, as the player will typically not be allowed to place new wagers in the second level betting circle 204 or the third level betting circle 206, as wagers can only be placed in the second level betting circle 204 by advancing a wager from the first level betting circle 202, and wagers in the third level betting circle 206 can only be placed by advancing a wager from the second level betting circle 204.

The table in FIG. 2 shows accommodations for six simultaneous players, although of course such a table can accommodate any number of simultaneous players. The configuration in FIG. 2 and methodology described herein illustrate one way to track and advance the status of each wager, however it can be appreciated that other methodologies can be used as well. For example, markers, digital readouts, etc., can be used to indicate a status of each bet.

Table I below illustrates an example of a first paytable (used for level one wagers), a second paytable (used for level two wagers), and a third paytable (used for level three wagers). Of course these are merely examples, and other paytables can be used as well. This paytable can be used, for example, in a simple player versus dealer stud poker game. For example, the player is dealt five cards and the dealer is dealt five cards. If the player's poker hand has a higher rank (as ranked by standard poker ranks as known in the art and as illustrated in Table I) then the player wins, otherwise the player loses. The player also wins a bonus based on the rank of his or her hand according to the respective paytable for the respective winning wager. The hands on the left column are listed in order from best (top) to worst (bottom), e.g., higher hands beat lower hands. Bets can be paid at even money for a winning hand plus the bonus payout. Alternatively, winnings can consist of only the bonus payout but no even money payouts. Thus, in an example of this latter embodiment, if the player gets a pair ("all other hands") on a level 1 wager (which uses paytable 1), then the player does not get paid anything (because the payout on paytable 1 is 0) but still gets to advance.

TABLE I

| | Paytable 1 | Paytable 2 | Paytable 3 |
|---|---|---|---|
| ROYAL FLUSH | 60/1 | 150/1 | 1000/1 |
| STRAIGHT FLUSH | 30/1 | 75/1 | 250/1 |
| 4 OF A KIND | 12/1 | 25/1 | 100/1 |
| FULL HOUSH | 5/1 | 9/1 | 20/1 |
| FLUSH | 4/1 | 6/1 | 10/1 |
| STRAIGHT | 3/1 | 5/1 | 8/1 |
| 3 OF A KIND | 2/1 | 3/1 | 6/1 |
| 2 PAIRS | 1/1 | 1/1 | 4/1 |
| ALL OTHER HANDS | 0 | 1/1 | 1/1 |

It is noted that paytable 2 is considered more favourable than paytable 1, and paytable 3 is considered more favourable than paytable 2. Favourable in this context means favourable to the player, as of course players are desirous of higher payouts. If paytable B is more favourable than paytable A, this can be defined in numerous ways. It could mean that each and every payout in paytable B is higher than its corresponding payout paytable A. It could alternatively mean that each and every payout in paytable B is higher than equal to the corresponding payout in paytable A. It could alternatively mean that the player's expected return on a wager for paytable B is higher than the player's expected return on the wager for paytable A using player optimal strategy. In this latter definition, it may be possible for one or more payouts on paytable B to be lower than the corresponding payout in paytable A, but nevertheless paytable B would still be more advantageous to the player mathematically.

An example of the above game using the paytables illustrated in Table I will now be presented. Joe bets a $1 initial bet in first level betting circle 202. The first game is dealt and Joe receives a 'Flush' as his, or her, first hand, consisting of Q, 10, 9, 7 and 3 of spades. The dealer has J, J, 8, 7, 2, so he has a pair of Jacks. Since Joe has the higher ranking poker hand, Joe wins at the first level so his $1 initial wager progresses to the second level betting circle. Thus, for example, dealer will pay the player's $1 initial bet ($1 at even money which is kept by Joe) and then move the player's $1 initial bet to the second level betting circle 204. Since Joe received a flush, according to paytable 1 (which is used for the first level) Joe also wins a bonus of 4/1 of $4 which is paid to him.

If Joe had lost the first game (e.g., the dealer had the higher hand), then the dealer would not pay Joe anything but instead take the $1 initial bet, and the method would end.

Now that the Joe's wager has been moved to the second level, he has the option of placing another initial wager again on the first level. The player is not required to place an additional bet if they do not wish to do so. As the player has reached the second level, the payouts for achieving a bonus hand will reflect on this and allow the player to receive higher awards than in the first level.

Joe also has the option of placing a new bet on the first level. Joe decides to place a $5 on the first level betting circle 202. This is in addition to the $1 bet Joe already has on the second level betting circle 204.

Now the second game is dealt and the player is dealt 5, 5, A, K, 10 for a pair of 5's and the dealer receives A, K, 7, 6, 4 for a hand of Ace high. So, Joe wins at level two and is paid a 'bonus' of 1/1 for having a pair using paytable 2. Thus, Joe wins $1 (even money) on the level two $1 wager and a $1 bonus payout ("all other hands" on paytable 2)

Joe is also paid even money on his $5 bet on the first level betting circle. Any bonus on this wager is paid according to paytable 1 (since this is a first level bet on the first level betting circle) there is no bonus for having a pair since this would fall under 'all other hands' under the paytable in Table I.

If Joe had lost the second game (e.g., the dealer had the higher hand), then the dealer would not pay Joe anything for the second game (but of course Joe would still get to keep his payout from the first game), the dealer would take both the $1 wager that is now on the second level betting circle 204 and the $5 wager that is on the first level betting circle 202 and the method would end.

The dealer now advances the $1 wager which is now on the second level betting circle 204 to the third level betting circle 206. The dealer also advances the $5 wager which is now on the first level betting circle 202 to the second level betting circle 204. Joe also decides to place a new $10 bet on the first level betting circle 202. Joe now has three live bets. Joe now has three wagers all running at the same time (simultaneous wagers) at the three various levels, each bet using a different paytable.

The dealer now deals out the third game. Joe is dealt 9, 8, 7, 6, 5 and receives a 'straight' and the dealer receives 9, 9, Q, J, 5 for a pair of 9's. Joe has the higher hand, since a straight beats a pair of 9's. Joe wins even money on the $1 wager (which is now on the third level betting circle 206) and is paid a 'bonus' of $8 (8/1) for obtaining a 'straight' on the final level (using paytable three). Joe also wins even money on the $5 wager on the second level betting circle 204 and wins a bonus of $25 (5/1) on this wager for obtaining a straight using the second paytable (from Table I). Joe also wins even money ($10) on the $10 bet which is currently on the first level betting circle 202, and wins a bonus of $30 (3/1) for making a straight using the first paytable.

In this example, there are only three levels, so the $1 wager which is now on the third level betting circle 206 is returned to the player. The $5 wager which is now on the second level betting circle 204 is now moved to the third level betting circle 206, and the $10 wager which is now on the first level betting circle 202 is moved to the second level betting circle 204. The method can continue in this fashion until the player loses.

In a further embodiment, instead of returning the winning wager that is in the third level betting circle to the player, this wager can remain in the third level betting circle and will be combined with any wager that is advancing into the third level betting circle from the second level betting circle. Game play then continues.

When the player loses, all live wagers on the table are taken by the house, and the player has the option to start anew by placing a new wager on the first level.

The above example used a poker game as the game to determine whether the player wins or loses, but it can be appreciated that any other wagering game can be used as well (e.g., blackjack, 3-card poker, etc.)

In a further embodiment, there is no dealer, and to win the player must achieve a hand of at least a predetermined rank, otherwise the player loses. Bonuses are paid on the rank of the player's hand.

In another embodiment, the player would be required to either pass or fold a hand, or if the player wishes to continue, then the player must place an additional raise wager along with the original bet (live bets) The raise wager can be less than, equal to, or more than the original bet (live bets). The raise wager could be placed at one, some, or all, of the levels.

In yet another embodiment, the player could place an optional additional wager if the player felt that their hand was good enough. The additional wager could be less than, equal to, or greater than the original wager(s) based on house rules. This additional wager could be placed at one or more of the levels.

In yet a further embodiment, the game may consist of the dealer receiving a hand at some levels and the player just playing against a pay-table at other levels. For example, the player may be required to beat the dealer to get to the final level but then plays against a paytable only for the final level payout.

In an additional embodiment, early levels (e.g., levels 1-2) would not have a paytable bonus at all (the player would win even money on the wagers but no bonus).

In yet a further embodiment, players may still receive a bonus on any level even if they lose the game because the dealer has a better hand. For example if the player receives a flush while the dealer receives a full house. Although the player loses the wager and will not progress to the next level the player can still get paid the bonus for achieving the flush. In an alternative embodiment, the player must win the hand in order to qualify for winning the bonus.

In yet another embodiment, increased payouts could be awarded to the player if the player beats the dealer and both the player and the dealer have bonus hands. For example, if the player is dealt a full house and the dealer is dealt a flush.

The player wins and could be paid more since both the player and the dealer have achieved bonus hands. This could be applied to some or all levels.

In yet an additional embodiment, the player will not receive a bonus if the dealer has not reached a certain ranking hand. For example, the dealer must qualify with a predetermined rank or higher (e.g., ace high or better) in order for the player to win the bonus payout.

In an additional embodiment, the player may need to have a qualifying hand in order to advance to the next level. For example, the player would need to have a king high in order for the player's bets to advance to a higher level. In a further embodiment, different levels can have different qualifying hands. For example, the level 1 wager needs a king high to advance (e.g., advance to a level 2 wager) while the level 2 wager needs a pair to advance (e.g., advance to a level 3 wager). Thus, different level wager(s) can have different qualifying hands (or requirements) to advance. Thus, it may be possible that on a game, one of the level wagers may advance while the other may not, since the rules for advancing will differ for different level wagers. For example, if a level 1 wager needs a king high to advance, and a level 2 wager needs a pair to advance, and the player is dealt a hand with rank of ace high (which is higher than king high but not a pair), the level 1 wager will advance but the level 2 wager will not advance and the wager loses (or alternatively the level 2 wager can be returned to the player).

Figure 3:
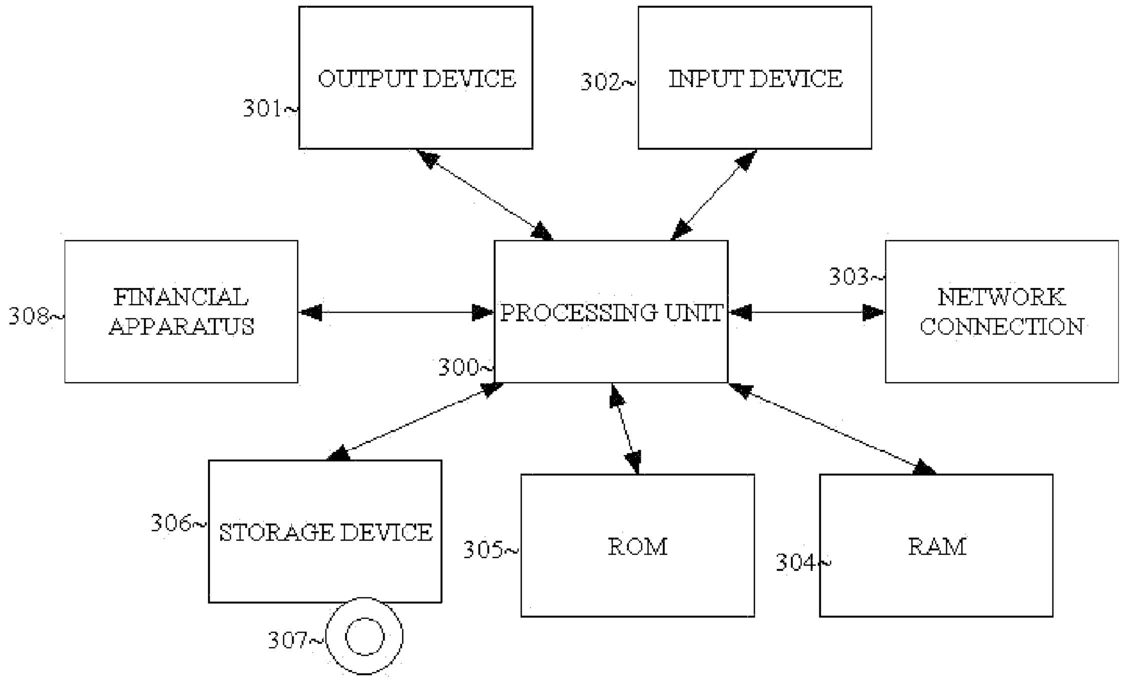
FIG. 3 is a block diagram illustrating exemplary hardware that can implement an electronic version implementing methods described herein, according to an embodiment.

FIG. 3 is a block diagram illustrating exemplary hardware that can implement an electronic version implementing methods described herein, according to an embodiment. In addition to being played in a physical casino table, the methods described herein can also be played on an electronic gaming device or on a computer using the Internet.

A processing unit 300 (such as a microprocessor and any associated components) is connected to an output device 301 (such as an LCD monitor, touch screen, CRT, etc.) and an input device 302 (e.g., buttons, a touch screen, a keyboard, mouse, etc.) The processing unit 300 can also be connected to a network connection 303, which can connect the electronic gaming device to a computer communications network such as the Internet, a LAN, WAN, etc. The processing unit 300 is also connected to a RAM 304 and a ROM 305. The processing unit 300 is also connected to a storage device 306 which can be a DVD-drive, CD-ROM, flash memory, etc. A computer readable storage medium 307 can store a program which can control the electronic device to perform any of the methods described herein. The processing unit 300 can also be connected to a financial apparatus 308 which can receive cash and convert the received cash into playable credits for use by the player when playing the electronic device. When the player decides to cash out any remaining credits, the financial apparatus 308 can issue coins or a cashless ticket (voucher) for the remaining credits which is redeemable by the player.

It is noted that the methods described herein can be played using any number of decks (e.g., 1-8 or more). Standard decks of 52 cards can be used, as well as other kinds of decks, such as Spanish decks, decks with wild cards, etc. The operations described herein can be performed in any sensible order. Furthermore, numerous different variants of house rules can be applied. For example, in blackjack, the dealer can hit on soft 17 or stand on soft 17, depending on house rules. Cards can be given their standard point values as known in the art (e.g., 2-10 have their face value, jack, queen, and king, have a point value of 10, and ace has a point value of 1 or eleven).

The methods herein are not limited to games with cards, and can also be applied to games using dice, wheels, etc.

The descriptions provided herein also include any hardware and/or software known in the art and needed to implement the operations described herein. Further, all methods described herein can be programmed on a digital computer and stored on any type of computer readable storage medium.

The many features and advantages of the invention are apparent from the detailed specification and, thus, it is intended by the appended claims to cover all such features and advantages of the invention that fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. A method to play a wagering card game based on blackjack, the method comprising:

executing instructions on a processor in a computer to implement the following operations:

receiving a wager from a player;

displaying through a display device on the computer a dealer's hand and a player's hand comprising at least two cards;

providing the player an option to add optional card(s) through an input device on the computer to the player's hand until the player stands or the total value of the player's hand cards exceeds 21;

resolving the dealer's hand on the display device on the computer; and determining whether the player wins or loses the game according to electronically stored predetermined blackjack rules which are implemented by the processor on the computer, the predetermined blackjack rules comprising:

1) if a total value of the player's hand cards exceeds 21 then the player loses the wager;

2) if a total value of the dealer's hand cards is 21 or less and is greater than the total value of the player's hand cards, then the player loses the wager;

3) if the total value of the player's hand cards is 21 or less and is greater than the total value of the dealer's hand cards, then the player wins the wager; and 4) if the total value of the dealer's hand cards is a single numerical point total selected from 22 to 26, then the wager pushes instead of being a winning wager if the total value of the dealer's hand cards is higher than 21 but not the single numerical point total;

resolving the wager according to said electronically stored predetermined blackjack rules.

2. The method according to claim 1, wherein a second player's hand of two cards is also dealt to the player with the player's hand, the second player's hand being played by the player.

3. The method according to clam 2, wherein the player having an option to switch cards between the player's hand and the second player's hand.

4. The method according to claim 1, wherein during the resolving the dealer's hand, the dealer must stand when the total value of dealer's hand cards is 17 or more.

5. The method according to claim 1 in which the dealer pays out on blackjacks, even if the total value of dealer's hand cards equals the single numerical point total.

6. The method according to claim 1, further comprising offering the player an optional wager that the total value of dealer's hand cards will equal the single numerical point total.

7. The method according to claim 6, wherein odds paid out on the optional wager is increased if the dealer's hand meets specified criteria.

8. The method according to claim 1, wherein the player is permitted to increase the wager after seeing one or more of the cards in the player's hand.

9. The method according to claim 1, wherein blackjacks are paid out at even money.

10. The method according to claim 9, wherein suited blackjacks are paid out at increased odds.

11. The method according to clam 1, wherein the dealer pays out if the player's hand comprises specified cards, irrespective of the total value of player's hand cards, provided that the total is less than 22.

12. The method according to claim 1, wherein if the player's hand includes a wild card, the wager is pushed if the total value of player's hand cards exceeds 21.

13. An apparatus to play a wagering card game based on blackjack comprising:

a processor in a computer configured to implement the following operations:

receiving a wager from a player;

displaying through a display device on the computer a dealer's hand and a player's hand comprising at least two cards;

providing the player an option to add optional card(s) through an input device on the computer to the player's hand until the player stands or the total value of the player's hand cards exceeds 21;

resolving the dealer's hand on the display device on the computer; and determining whether the player wins or loses the game according to electronically stored predetermined blackjack rules stored in which are implemented by the processor on the computer, the predetermined blackjack rules comprising:

1) if a total value of the player's hand cards exceeds 21 then the player loses the wager;

2) if a total value of the dealer's hand cards is 21 or less and is greater than the total value of the player's hand cards, then the player loses the wager;

3) if the total value of the player's hand cards is 21 or less and is greater than the total value of the dealer's hand cards, then the player wins the wager; and 4) if the total value of the dealer's hand cards is a single numerical point total selected from 22 to 26, then the wager pushes instead of being a winning wager if the total value of the dealer's hand cards is higher than 21 but not the single numerical point total;

resolving the wager according to said electronically stored predetermined blackjack rules.

14. The apparatus according to claim 13, wherein a second player's hand of two cards is also dealt to the player with the player's hand, the second player's hand being played by the player.

15. The apparatus according to clam 14, wherein the player has an option to switch cards between the player's hand and the second player's hand.

16. The apparatus according to claim 13, wherein the wager pays out on blackjacks, even if the total value of dealer's hand cards equals the single numerical point total.

17. A method for a player to play a wagering card game based on blackjack, the method comprising:

using an input device on a computer connected to the Internet, placing a wager;

using a display device on the computer, viewing a dealer's hand and a player's hand comprising at least two cards;

using the input device on the computer, optionally drawing additional cards which are added to the player's hand until a player stands or a total value of the player's hand cards exceeds 21;

using the display on the computer, viewing a resolving of the dealer's hand;

using the display on the computer, viewing whether the player wins or loses the game according to electronically stored predetermined blackjack rules which are implemented by a processor on the computer, the predetermined blackjack rules comprising:

1) if a total value of the player's hand cards exceeds 21 then the player loses the wager;

2) if a total value of the dealer's hand cards is 21 or less and is greater than the total value of the player's hand cards, then the player loses the wager;

3) if the total value of the player's hand cards is 21 or less and is greater than the total value of the dealer's hand cards, then the player wins the wager; and 4) if the total value of the dealer's hand cards is a single numerical point total selected from 22 to 26, then the wager pushes instead of being a winning wager if the total value of the dealer's hand cards is higher than 21 but not the single numerical point total;

using the display on the computer, viewing a resolution of the wager according to said electronically stored predetermined blackjack rules.

18. The method according to claim 17, wherein a second player's hand of two cards is also dealt to the player with the player's hand, the second player's hand being played by the player.

19. The method according to claim 18, wherein the player having an option to switch cards between the player's hand and the second player's hand.

* * * * *